United States Patent
Klein et al.

(10) Patent No.: US 8,588,774 B2
(45) Date of Patent: Nov. 19, 2013

(54) TECHNIQUE FOR DETERMINING A CELL-IDENTITY

(75) Inventors: Oliver Klein, Nuremberg (DE); Karsten Brüninghaus, Salzgitter (DE)

(73) Assignee: Unwired Planet, LLC, Reno, NV (US)

( * ) Notice: Subject to any disclaimer, the term of this patent is extended or adjusted under 35 U.S.C. 154(b) by 95 days.

(21) Appl. No.: 12/964,398

(22) Filed: Dec. 9, 2010

(65) Prior Publication Data

US 2011/0306341 A1 Dec. 15, 2011

Related U.S. Application Data

(60) Provisional application No. 61/292,906, filed on Jan. 7, 2010.

(30) Foreign Application Priority Data

Dec. 10, 2009 (EP) ..................................... 09015325

(51) Int. Cl.
*H04W 4/00* (2009.01)

(52) U.S. Cl.
USPC ............. 455/434; 455/437; 455/436; 455/75; 455/76; 370/441; 370/336; 370/354; 370/208; 370/476; 370/295; 370/285; 370/331

(58) Field of Classification Search
USPC ......... 370/441, 336, 354, 208, 279, 350, 442, 370/478, 295, 482, 331; 455/434, 437, 436, 455/75, 76
See application file for complete search history.

(56) References Cited

U.S. PATENT DOCUMENTS

| | | | | |
|---|---|---|---|---|
| 6,356,555 | B1 * | 3/2002 | Rakib et al. | 370/441 |
| 7,764,593 | B2 * | 7/2010 | Kim et al. | 370/208 |
| 7,769,119 | B2 * | 8/2010 | Chun et al. | 375/354 |
| 2008/0273522 | A1 | 11/2008 | Luo et al. | |
| 2009/0303969 | A1 * | 12/2009 | Lee et al. | 370/336 |
| 2009/0304198 | A1 * | 12/2009 | Herre et al. | 381/66 |
| 2011/0038284 | A1 * | 2/2011 | Senarath et al. | 370/279 |
| 2011/0268104 | A1 * | 11/2011 | Akita et al. | 370/350 |

OTHER PUBLICATIONS

European Telecommunications Standards Institute. ETSI TS 136 211, V8.7.0 (Jun. 2009). LTE; Evolved Universal Terrestrial Radio Access (E-UTRA); Physical channels and modulation (3GPP TS 36.211 version 8.7.0 Release 8). Jun. 2009.

(Continued)

*Primary Examiner* — Joseph Arevalo
(74) *Attorney, Agent, or Firm* — Nixon & Vanderhye P.C.

(57) ABSTRACT

A technique for cell-identity detection is provided. In one method embodiment, at least one cell-identity in a cellular telecommunication network is determined. The method comprises the steps of receiving a synchronization signal, calculating first correlations and second correlations as well as determining the at least one cell-identity. The received synchronization signal includes a first partial signal and a second partial signal. The first correlations are calculated between the first partial signal and first reference signals, each of which indicates one or more first cell-identities. The second correlations are calculated between the second partial signal and second reference signals, each of which indicates one or more cell-identities out of the first cell-identities. The second reference signals are selected depending on the first correlations. The cell-identity is determined based on the second correlations. The complexity for cell-identity detection is reduced by the technique.

20 Claims, 4 Drawing Sheets

(56) References Cited

OTHER PUBLICATIONS

Tsai, P.-Y. et al. "A New Cell Search Scheme in 3GPP Long Term Evolution Downlink OFDMA Systems." IEEE Conference on Wireless Communications & Signal Processing 2009 (WCSP 2009), Piscataway, NJ, US, Nov. 13, 2009, pp. 1-5.

Extended European Search Report dated Jun. 2, 2010 in EP Application No. 09 015 325.5.

* cited by examiner

TECHNIQUE FOR DETERMINING A CELL-IDENTITY

RELATED APPLICATIONS

This application claims priority to EP 09015325.5, filed Dec. 10, 2009, and U.S. Provisional Application Ser. No. 61/292,906, filed Jan. 7, 2010, both of which are incorporated herein by reference in their entirety.

TECHNICAL FIELD

The present disclosure relates to determining a cell-identity or a cell-identity group in a cellular telecommunication network. In particular, the disclosure relates to determining one or more cell-identities by cross-correlation analysis.

BACKGROUND

Modern communication networks for mobile communication are organized in cells. As one example, 3GPP Long Term Evolution (LTE) networks organize physical-layer cell-identities in 168 unique physical-layer cell-identity groups (represented by $N_{ID}^{(1)} = 0, \ldots, 167$), each cell-identity group $N_{ID}^{(1)}$ comprising three cell-identities (represented by $N_{ID}^{(2)} = 0, 1, 2$), which amounts to a total of 504 cell-identities $N_{ID}^{CELL} = 3 N_{ID}^{(1)} + N_{ID}^{(2)}$ addressable by a pair of numbers $N_{ID}^{(1)}$ and $N_{ID}^{(2)}$.

The cell-identity $N_{ID}^{(2)}$ is detected in a primary synchronization signal. For detection of the cell-identity group $N_{ID}^{(1)}$, an analysis of a secondary synchronization signal (S-SSIG) $X_{S\text{-}SSIG}$ involves cross-correlations with all possible S-SSIGs represented by reference signals, each of which indicates a cell-identity group $N_{ID}^{(1)}$. A list of correlation peaks that exceed a threshold (and their correlation peak values) is returned as cell-identity group candidates.

A first conventional technique directly implements a definition of the correlation, $$c(N_{ID}^{(1)}, s_{pos}, cp_{type}) = \sum_{n=0}^{61} X_{S\text{-}SSIG}^{cp_{type}}(n) \cdot d_{N_{ID}^{(1)}, s_{pos}}^{N_{ID}^{(2)}}(n), \quad \text{(Eq. 1)}$$

to assess a set of communication parameters including the cell-identity group $N_{ID}^{(1)}$, two possible subframe positions $s_{pos}$ (at 0 ms or 5 ms) and two possible cyclic prefix types $cp_{type}$ (normal or extended). The received S-SSIG assuming a cyclic prefix type $cp_{type}$ to be tested is denoted by $X_{S\text{-}SSIG}^{cp_{type}}$ and the reference signal is denoted by $$d_{N_{ID}^{(1)}, s_{pos}}^{N_{ID}^{(2)}}.$$

The reference signal $$d_{N_{ID}^{(1)}, s_{pos}}^{N_{ID}^{(2)}}$$

is a sequence of elements in $\{-1, +1\}$, for which reason products in Eq. 1 between elements of the synchronization signal $X_{S\text{-}SSIG}^{cp_{type}}(n)$ and the reference signal $$d_{N_{ID}^{(1)}, s_{pos}}^{N_{ID}^{(2)}}(n)$$

are not implemented by multiplication steps, but as fast sign changes. In the absence of multiplications steps, the computational complexity depends on the number of involved addition steps.

Computation of the correlations requires considerable hardware resources as the synchronization signals occur twice per 10 ms radio frame, and there are numerous combinations of receive signal data and reference signals for each set of communication parameters to be evaluated. The computational complexity of the above implementation requires $2 \times 2 \times 168 \times 62 = 41\,664$ steps of addition for evaluating each combination of the two cyclic prefix types ($cp_{type} = 0, 1$), the two subframe timings ($s_{pos} = 0, 1$), and the 168 possible cell-identity groups ($N_{ID}^{(1)}$), each evaluation involving 62 additions for correlating corresponding sequences of length $l=62$. The conventional computation technique thus consumes considerable battery resources and causes a notable cell search time.

A more advanced implementation exploits an alternating structure of the standard definition of the reference signals $$d_{N_{ID}^{(1)}, s_{pos}}^{N_{ID}^{(2)}}.$$

Computation of the correlation $c(N_{ID}^{(1)}, s_{pos}, cp_{type})$ is split up in two partial correlations of even-numbered elements with a first reference signal $$d_{N_{ID}^{(1)}, s_{pos}}^{N_{ID}^{(2)}}(2n)$$

and odd-numbered elements with a second reference signal $$d_{N_{ID}^{(1)}, s_{pos}}^{N_{ID}^{(2)}}(2n+1)$$

of length $l/2 = 31$:

$$c(N_{ID}^{(1)}, s_{pos}, cp_{type}) = \sum_{n=0}^{30} X_{S\text{-}SSIG}^{cp_{type}}(2n) \cdot d_{N_{ID}^{(1)}, s_{pos}}^{N_{ID}^{(2)}}(2n) + \sum_{n=0}^{30} X_{S\text{-}SSIG}^{cp_{type}}(2n+1) \cdot d_{N_{ID}^{(1)}, s_{pos}}^{N_{ID}^{(2)}}(2n+1).$$

According to the standard definition of 3GPP Technical Specification TS 36.211 (V8.2.0, 2008-03) in Sect. 6.11.2.1 for the reference signals $$d_{N_{ID}^{(1)}, s_{pos}}^{N_{ID}^{(2)}},$$

independently evaluable subsequences for the odd- and even-numbered elements of the reference signals $$d_{N_{ID}^{(1)}, s_{pos}}^{N_{ID}^{(2)}}$$

are:

$$d_{N_{ID}^{(1)}, s_{pos}}^{N_{ID}^{(2)}}(2n) = s_{m_x}(n) \cdot c_0^{N_{ID}^{(2)}}(n) = d_{m_x}^{N_{ID}^{(2)}}(2n),$$

wherein a first parameter $m_x = m_{s_{pos}}(N_{ID}^{(1)})$ depends on the communication parameters cell-identity group, $N_{ID}^{(1)}$, and the subframe position, $s_{pos}$; and $$d_{N_{ID}^{(1)}, s_{pos}}^{N_{ID}^{(2)}}(2n+1) = s_{m_y}(n) \cdot c_1^{N_{ID}^{(2)}}(n) \cdot z_{m_x \bmod 8}(n) = d_{m_x \bmod 8, m_y}^{N_{ID}^{(2)}}(2n+1),$$

wherein a second parameter is $m_y = m_{1-s_{pos}}(N_{ID}^{(1)})$ and the first parameter $m_x = m_{s_{pos}}(N_{ID}^{(1)})$ enters modulo 8. Integer-valued functions $m_0(N_{ID}^{(1)})$ and $m_1(N_{ID}^{(1)})$ are defined in document 3GPP TS 36.211.

Given the previously determined value of $N_{ID}^{(2)}$, there are M=31 different first reference signals $$d_{m_x}^{N_{ID}^{(2)}}$$

parameterized by $m_x=0, \ldots, 30$. Furthermore, there are 8×M different second reference signals $$d_{m'_x,m_y}^{N_{ID}^{(2)}}$$

parameterized by $m'_x=0, \ldots, 7$ and $m_y=0, \ldots, 30$. A pair $(m_x, m_y)$ of the first parameter $m_x$ and the second parameter $m_y$ (with $m_y \neq m_x$) results from the correlation analysis. The pair $(m_x, m_y)$ uniquely determines the pair $(N_{ID}^{(1)}, s_{pos})$ of physical-layer communication parameters: In case $m_x<m_y$, $s_{pos}=0$ and $(m_x, m_y)=(m_0, m_1)$ determines the cell-identity group $N_{ID}^{(1)}$ according to Table 6.11.2.1-1 in 3GPP TS 36.211 (V8.2.0, 2008-03). Otherwise, if $m_x>m_y$, $s_{pos}=1$ and $(m_y, m_x)=(m_0, m_1)$ determines $N_{ID}^{(1)}$.

Accordingly, there is a total of (1+8)×M first and second reference signals, and the partial correlations with the receive signal $X_{S-SSIG}^{cPtype}$ for the two cyclic prefix types ($cp_{type}$) require adding up the l/2=31 elements, which amounts to 2×(1+8)×M×31 additions for each partial correlation. Adding the results of the two partial correlations to obtain the (full) correlation for each of the 168×2×2 possible sets ($N_{ID}^{(1)}, s_{pos}, cp_{type}$) of communication parameters requires one addition for each set. Hence, the total number of additions is reduced to 2×9×31×31+168×2×2=17 970.

From "A New Cell Search Scheme in 3GPP Long Term Evolution Downlink OFDMA Systems", Wireless Communications & Signal Processing, 2009, a cell search procedure in 3GPP LTE downlink systems is known. In a first step of the procedure, a coarse symbol timing, and fractional Carrier Frequency Offset (CFO) is detected in order to process the frequency-domain data. In a second step after acquiring the symbol timing, an integer CFO and a sector cell index $N_{ID}^{(2)}$ are simultaneously detected by cross-correlating the received frequency-domain data with Primary Synchronization Channel (P-SCH) signals. In a third step, the frame timing and cell-identity group $N_{ID}^{(1)}$ are detected using the Secondary Synchronization Channel (S-SCH) signal and the information about $N_{ID}^{(2)}$ deduced in the second step.

In US 2008/0273522 A1 various techniques for generating synchronization signals based on a M-sequence in order to convey cell parameters (e.g., cell IDs) are taught. In one embodiment, the secondary synchronization signal is based on two cyclic shifted M-sequences with a length of N=31, wherein the cyclic shifts are indicative of the cell ID. The secondary synchronization signal generated in such a way may be processed at a user terminal UE, in order to detect the cell-identity group $N_{ID}^{(1)}$ by using the cell index $N_{ID}^{(2)}$ and performing a M-sequence Transform (FMT) on two input sequences which correspond to those two M-sequence based sequences of the generated synchronization signal.

SUMMARY

It is an object to further reduce the computational complexity of cell identification.

According to a first aspect, the object is solved by a method of determining at least one cell-identity in a cellular telecommunication network. The method comprises the steps of receiving a synchronization signal, calculating first correlations, calculating second correlations, and determining the at least one cell-identity therefrom. The received synchronization signal includes a first partial signal and a second partial signal. The first correlations are calculated between the first partial signal and first reference signals, each of the first reference signals indicating one or more first cell-identities. The second correlations are calculated between the second partial signal and second reference signals, each of the second reference signals indicating one or more cell-identities out of the first cell-identities. The second reference signals are selected depending on the first correlations. The determination of the at least one cell-identity is based on the second correlations. The term "cell-identity" as used herein encompasses an identification of a single cell as well as an identification of a group of cells.

The first cell-identities allow for a pre-selection depending on the first correlations prior to calculating the second correlations. This pre-selection may reduce the complexity of remaining calculations. By way of example, if there is a number of $M_1$ first reference signals (and a proportional number of 2×$M_1$ first correlations) and a total number of $M_2$ possible second reference signals (and a proportional number of 2×$M_2$ "conventional" second correlations without pre-selection), the conventional implementation involves 2×($M_1$+$M_2$)×l/2 additions only for generating the first and second (partial) correlations. (In the introductory example, $M_1$=M and $M_2$=8×M.) Selecting, depending on the first correlations, $M'_2$ second reference signals (with $M'_2<M_2$) out of the $M_2$ possible second reference signal can reduce the number of additions to 2×($M_1$+$M'_2$)×l/2.

The selected second reference signal can correspond to a maximum of the first correlations or to N>1 highest first correlations. Alternatively, the selected second reference signals can correspond to those first correlations which fulfill a specific threshold condition (e.g., exceed a predefined threshold value). A selection of the second reference signals can stop after a predetermined number of second reference signals has been selected. This allows for control over the number of possible cell-identity candidates and the required computational complexity, particularly in real-time applications.

The first reference signals can be parameterized by a first parameter and the second reference signals can be parameterized by the first parameter and a second parameter. A maximum of the first correlations can determine the first parameter used in the calculation of the second correlations. By continuation of the example, the number of $M_1$ first reference signals can be parameterized by the first parameter and the number of $M_2=k_1 \times k_2$ possible second reference signals can be parameterized by a pair of the first parameter and the second parameter, the second parameter assuming $m_2$ different values or states (and the first parameter being mapped onto $k_1<M_1$ or $k_1=M_1$ values or sub-states). This allows rapidly selecting (and addressing) the second reference signals by a choice of the first parameter depending on the first correlations. The number of additions for generating the partial correlations can be reduced to 2×($M_1$+$k_2$)×l/2.

The method may further comprise the step of generating a list of determined cell-identities sorted according to a sum of a pair of first correlation and second correlation, the pair corresponding to the listed cell-identity. The sums corresponding to each of the listed cell-identity candidates can provide a criterion or probability for applying the corresponding listed cell-identity candidate.

The synchronization signal can be comprised of signal samples, wherein the first partial signal comprises even-numbered signal samples and the second partial signal comprises odd-numbered signal samples. Such a scrambling of the partial signals can improve a tolerance to perturbing burst signals or an effectiveness of forward error correction techniques.

The selected second reference signals can further comprise a signal representation of a previous (or current) cell-identity. This approach can ensure continuity in the applied cell-identity. Furthermore, since the previous (or current) cell-identity may have a high probability of being also best suited at a later time (depending on a speed of motion or a rate of cell changes), the cell search time can be shortened.

The determination of the at least one cell-identity can further depend on a code distance between at least one of the first and second reference signal and one of the first partial signal, the second partial signal, and the synchronization signal. Alternatively or in addition, the second reference signals can be selected depending on a code distance between the first reference signal and the first partial signal. The code distance can provide a further measure for an ence signal and the first partial signal. The code distance can provide a further measure for an optimal and reliable determination of the at least one cell-identity.

The generation of a (sorted) list of the determined cell-identities and/or the selection of second reference signals (for calculating the second correlations) may be terminated by a stop criterion depending on at least one of the first correlation, the second correlation, the sum of the first and second correlations, and the code distance. The code distance measure is beneficial for sorting-out cell-identity candidates having a received synchronization signal (contribution) that exceeds a certain number of bit errors.

Generating at least one of the first reference signals and the second reference signals can be based on a maximum length sequence (also known as m-sequence). The calculation of at least one of the first correlations and the second correlations can utilize a Modified Hadamard Transformation (MHT) (based on the maximum length sequence). Correlation calculations utilizing the MHT can be more efficient. While a conventional method of correlation computation may require $M \times l/2$ additions, the computational complexity of the MHT may scale as $\text{ceil}(\log_2(M)) \times l/2$, wherein $P = \text{ceil}(\log_2(M))$ is the lowest integer P such that $2^P \geq M$. This may further reduce the cell search time and save processor power, particularly for large M.

The first reference signals $d_{m_x}(2n)$ can be generated by first scrambling sequences, preferably as products of first scrambling sequences, according to $$d_{m_x}(2n) = s_{m_x}(n) \cdot c_0(n).$$

Second scrambling sequences, preferably products thereof, may generate the second reference signals $d_{m_x,m_y}(2n+1)$ according to $$d_{m_x,m_y}(2n+1) = s_{m_y}(n) \cdot c_1(n) \cdot z_{m_x}(n).$$

Herein, sequences in n (on the right-hand side) can be the scrambling sequences. A pair of a first parameter $m_x$ and a second parameter $m_y$ can uniquely indicate one cell-identity. The pair of the first and second parameters may further indicate a slot position (for the receive signal in the time domain). A representation of the first and/or second reference signals in factors of scrambling sequences allows a fast reference signal generation.

The scrambling sequences can furthermore be represented as part of the MHT. The calculation of the first correlations can utilize the MHT according to $$c_{even}(m_x) = \text{MHT}(X(2n) \cdot c_0(n)).$$

The calculation of the second correlations can utilize the MHT according to $$c_{odd}(m_x, m_y) = \text{MHT}(X(2n+1) \cdot c_1(n) \cdot z_{m_x}(n)).$$

This allows using the first and/or second parameter as a parameter of the MHT. Advantageously, one of the scrambling sequences, preferably a scrambling sequence depending on the first parameter and/or the second parameter, can be eliminated by the MHT.

Each of the first and/or second reference signals can indicate (besides one or more cell-identities) further communication parameters. Such communication parameters can include a timing position for the receive signal. Particularly, the communication parameters can include a slot timing and/or a cyclic prefix type (of the receive signal).

According to another aspect, the object is solved by a computer program product comprising program code for performing the steps of one of aforementioned methods when the computer program product is executed on one or more computer devices. This allows a flexible and cost-effective realization. Advantageously, computational resources can be reallocated depending on a state (online/offline) of a downlink connection (defined by the communication parameters). The object is also solved by a computer-readable recording medium storing the computer program product.

According to a still further aspect, the object is solved by a device for determining at least one cell-identity in a cellular telecommunication network. The device comprises a receiver and a processor. The receiver is adapted to receive a synchronization signal including a first partial signal and a second partial signal. The processor is adapted to calculate first correlations between the first partial signal and first reference signals, wherein each of the first reference signals indicate one or more first cell-identities. The processor is further adapted to calculate second correlations between the second partial signal and second correlation signals, wherein each of the second reference signals indicate one or more cell-identities out of the first cell-identities. The processor or an Application Specific Integrated Circuit is also adapted to select the second reference signal depending on the first correlations. The processor or a set of logical gates is further adapted to determine the at least one cell-identity based on the second correlations.

The selected second reference signals can correspond to a maximum of the first correlations or to $N>1$ highest first correlations.

The first reference signals can be parameterized by a first parameter. The second reference signals can be parameterized by the first parameter and a second parameter. For the selection of the second reference signals, performed the processor depending on the first correlations, a maximum of the first correlations determines the (corresponding) first parameter in the (subsequent) calculation of the second correlations.

BRIEF DESCRIPTION OF THE DRAWINGS

An embodiment will now be discussed in greater detail with reference to the drawings, in which.

DETAILED DESCRIPTION

In the following description, for purposes of explanation and not limitation, specific details are set forth, such as individual steps for processing a certain receive signal, in order to provide a thorough understanding of the current disclosure. It will be apparent to one skilled in the art that the current technique may be practiced in other embodiments that depart from these specific aspects.

Those skilled in the art will appreciate that functions explained hereinbelow may be implemented using individual hardware circuitry, using software functioning in conjunction with a programmed microprocessor or a general purpose computer, using an Application Specific Integrated Circuit (ASIC) and/or using one or more Digital Signal Processors (DSPs).

Figure 1:
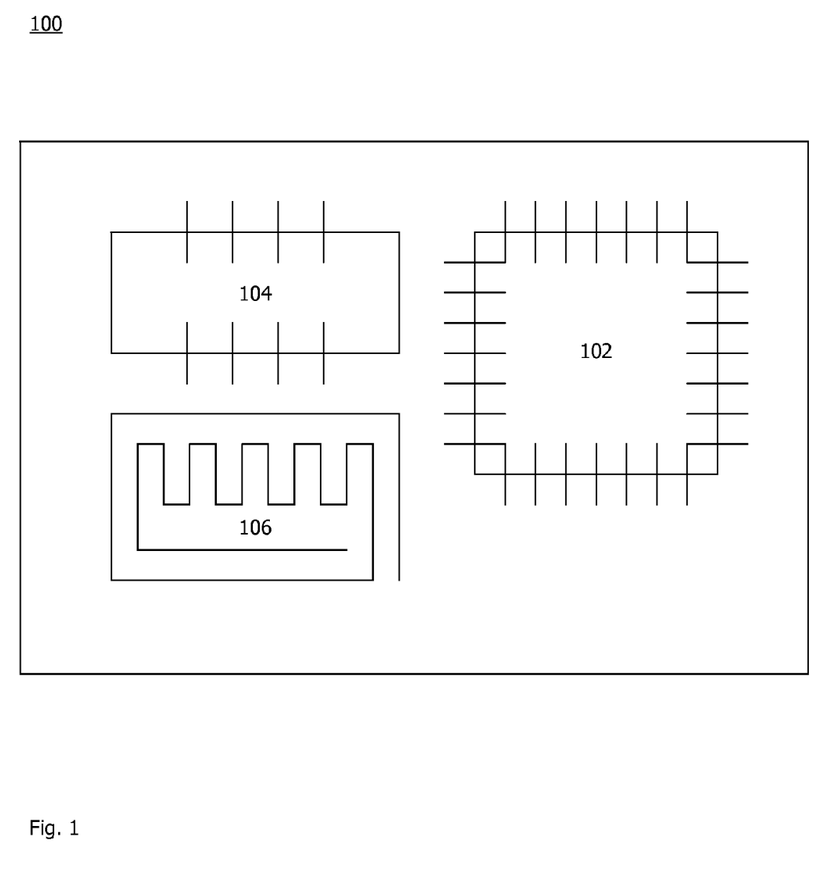
FIG. 1 schematically shows a device embodiment.

FIG. 1 shows an embodiment of a device 100 for determining a set of communication parameters ("parameter set") including (at least one) cell-identity group (denoted by $N_{ID}^{(1)}$), a subframe position (denoted by $s_{pos}=0, 1$) at either 0 ms or 5 ms, and a cyclic prefix type (denoted by $cp_{type}$) indicative of a normal or an extended cyclic prefix. The device is part of a receive stage in a mobile terminal, such as a mobile telephone, a network card, a navigation device, or a netbook.

The device 100 comprises a processor 102 connected to a memory 104 and a receiver 106. The processor 102 and the receiver 106 are adapted to perform primary synchronization as well as secondary synchronization.

During primary synchronization, the device 100 receives a primary synchronization signal (P-SSIG) to detect a physical-layer cell-identity $N_{ID}^{(2)}$ within the (yet unknown) cell-identity group. The P-SSIG also serves as a basis for an initial frequency offset estimation exploiting the property of Zadoff-Chu sequences that, under frequency offset, the detected peak timing is shifted. Correlation peaks for twelve possible frequency offsets are tested in combination with two polyphases of three possible Zadoff-Chu sequences indicative of the cell-identity $N_{ID}^{(2)}=0, 1, 2$. As a result of the 2×3×12=72 P-SSIG correlations, a list of time position candidates is generated. After detection of the cell-identity $N_{ID}^{(2)}$, a coarse timing (for symbol, slot and frame position) is performed.

During secondary synchronization, the physical-layer cell-identity $N_{ID}^{(2)}$, the coarse timing and the initial frequency offset estimation are applied to analyze a secondary synchronization signal (S-SSIG). The S-SSIG is received according to step 202 of flow diagram 200 (see FIG. 2) and undergoes preprocessing including low-pass filtering and channel estimation correction. The processor 102 is adapted to calculate first and second correlations for a first and second partial signals (included in the received synchronization signal) according to steps 204 and 206, respectively. The steps 202, 204, and 206 are looped for averaging over several blocks of S-SSIG data to improve a result on the correlations.

Figure 2:
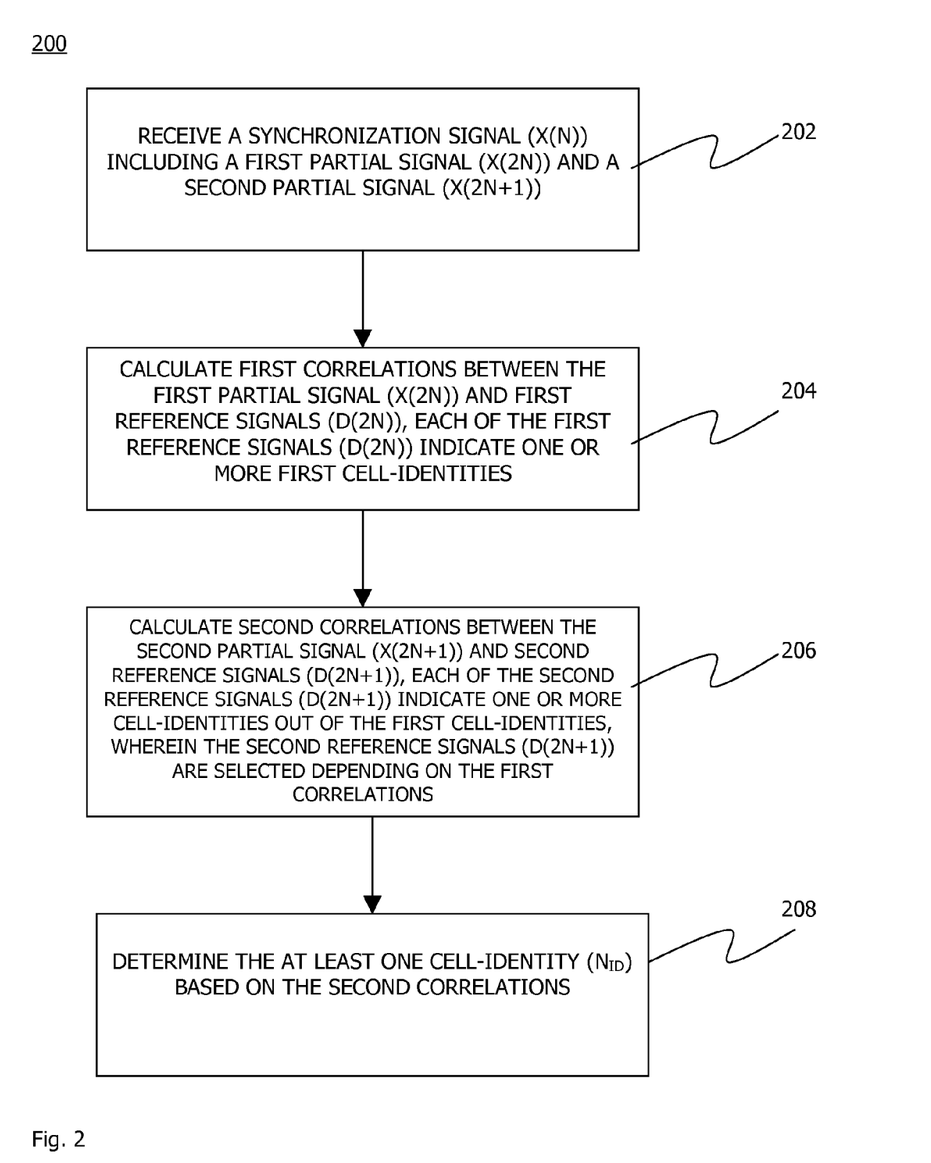
FIG. 2 schematically shows a method embodiment, which can be performed by the device embodiment of FIG. 1.

The first partial signal $X(2n)$ comprises even-numbered elements of the synchronization signal $X(n)$. The first correlations are calculated for each of a plurality of first reference signals $d(2n)$ in the step 204. Each first reference signal $d(2n)$ indicates a certain group of parameter sets. The groups of parameter sets indicated by different first reference signals are mutually disjoint. The first correlations serve as a pre-evaluation for candidate parameter sets among the groups of parameter sets indicated by the first reference signals. The first correlation, for example the square of its modulus, is used as an indication of the likelihood or suitability of the indicated group of parameter sets.

After pre-selecting one or more groups of parameter sets out of the groups indicated by the first reference signals based on the corresponding first correlations, second correlations are calculated in the step 206. The second correlations are calculated for a complementary second partial signal $X(2n+1)$ of the synchronization signal $X(n)$. Each of the second correlations represents the correlation between the second partial signal $X(2n+1)$ and one of a plurality of second reference signals $d(2n+1)$. Each of the second reference signals indicates one or more parameter sets out of one of the pre-selected groups.

In step 208, at least one parameter set is determined based on the second correlations. Since the first and second partial signals are complementary to the synchronization and the calculation of the correlation is linear in the partial signals, the sum of the first correlation and the second correlation equals a (complete) correlation of the (full) synchronization signal $X(n)$ with respect to a combined reference signal $d(n)$ comprising the (alternating) elements of the first and second reference signals. The (complete) correlation is a suitable measure indicating a parameter set, and in particular a cell-identity (or cell-identity group) regarding a quality of a communication link to the cell-identity (or cell-identity group). Therefore, in an advanced embodiment the step 208 of determining is based on the (complete) correlation.

Figure 3:
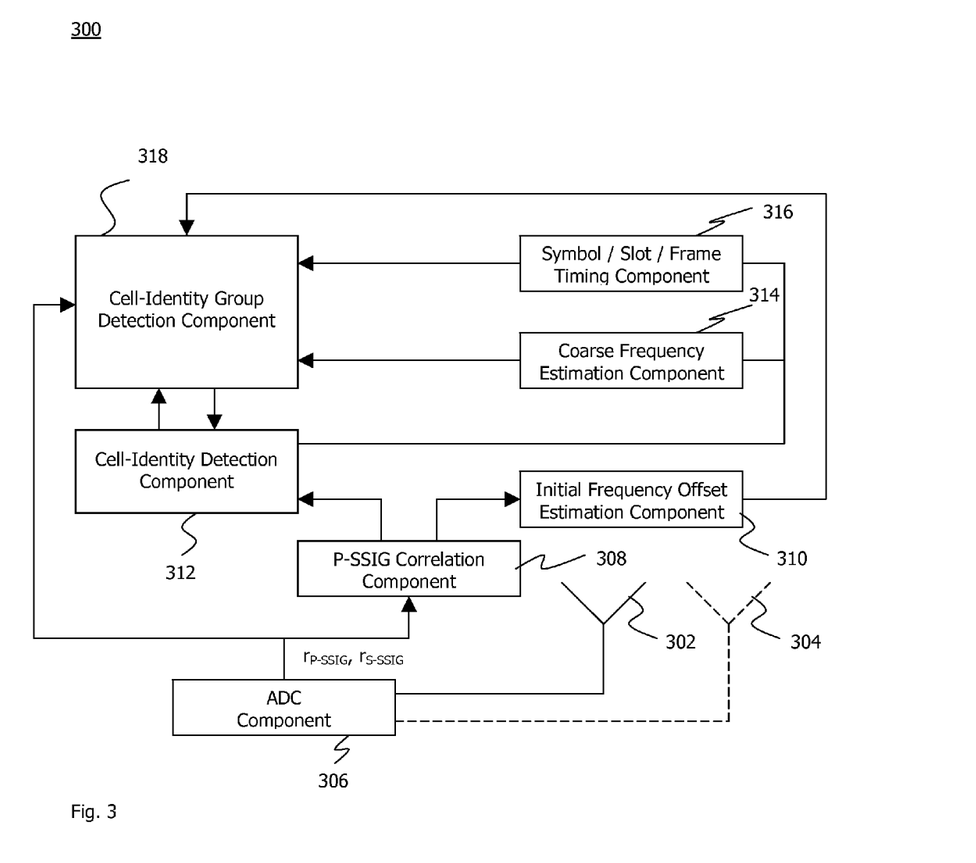
FIG. 3 schematically shows functional components including a cell-identity group detection component realized by the device embodiment of FIG. 1.
Figure 4:
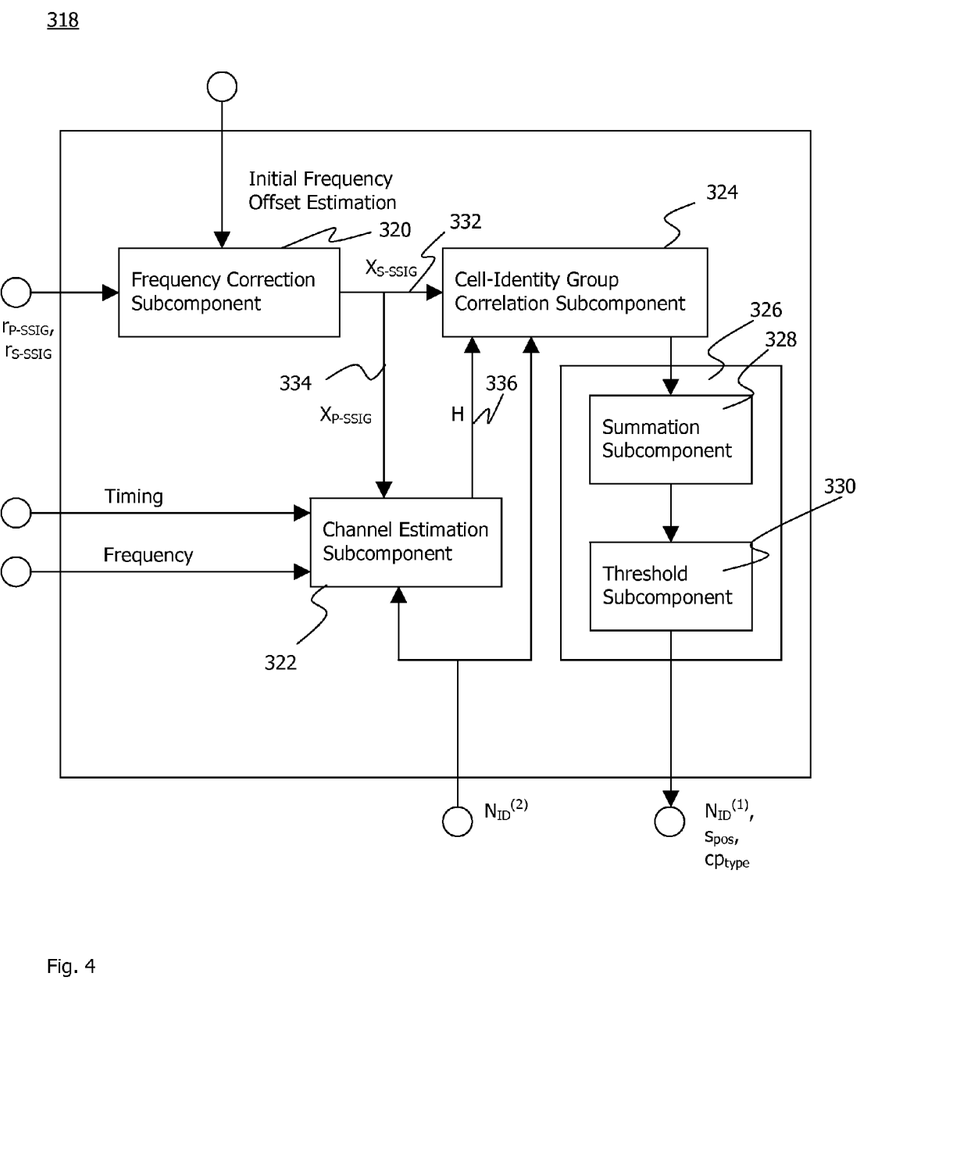
FIG. 4 schematically shows further details of the cell-identity group detection component of FIG. 3.

FIGS. 3 and 4 provide gradually increasing details of structural and functional features of the device embodiment 100 and the method embodiment 200. Component diagram 300 in FIG. 3 shows two receiving antennas 302 and 304 of the device 100. Having more than one antenna allows for a compensation of fading in the communication link by adapting gain and weight of the antennas 302 and 304. In a reduced complexity embodiment, the second receiving antenna 304 is omitted.

An analog-to-digital conversion component 306 provides a digital data stream as a sequence of complex-valued amplitudes in the time domain for the downlink connection. The analog-to-digital conversion component 306 further performs low-pass filtering, and the digital signal is down-sampled for further processing. A signal flow (indicated by arrows between components of the diagram 300) includes parallel signal propagation for two receive signals corresponding to the two antennas 302 and 304.

The received signals include downlink physical signals such as downlink reference signals and synchronization signals (SSIGs). The synchronization signals are split into the P-SSIG and the S-SSIG. The primary synchronization is performed by the P-SSIG correlation component 308, which provides timing, frequency synchronization, and the cell-identity $N_{ID}^{(2)}$ based on the P-SSIG cross-correlation results. The P-SSIG correlation component 308 provides a list of possible frequency offsets to an initial frequency offset estimation component 310, which processes the list to detect the initial frequency offset. The process is accomplished after a longer period of lost cell synchronization or after switching-on the mobile terminal utilizing the present disclosure.

A cell-identity detection component 312 reads the correlations results of the P-SSIG correlation component 308 and generates a list of cell-identities $N_{ID}^{(2)}$ together with respective timings $$t_{cand}^{N_{ID}^{(2)}}.$$

Based on a phase difference between the P-SSIG and the S-SSIG in the frequency domain, a coarse frequency estimation is provided by a coarse frequency estimation component 314. A timing component 316 (for OFDM symbols, downlink slots, and radio frames) provides a refined timing based on the S-SSIG. The S-SSIG is used to estimate a channel impulse response and to derive a timing tracking value.

A physical-layer cell-identity group detection component 318 determines the cell-identity group $N_{ID}^{(1)}$ and the further parameters of slot position, $s_{pos}$, and cyclic prefix type, $cp_{type}$. The cell-identity group detection component 318 uses the results of the components 312, 314, and 316 as well as a potential initial frequency offset estimation provided by the component 310 for the given $N_{ID}^{(2)}$. The cell-identity group detection component 318 generates a list of valid physical-layer cell-identity groups $N_{ID}^{(1)}$. The list is fed back to the cell-identity detection component 312.

The structural and functional features of the cell-identity group detection component 318 are shown in more detail in FIG. 4. The cell-identity group detection component 318 comprises a frequency correction subcomponent 320, a P-SSIG-based channel estimation subcomponent 322, a cell-identity group correlation subcomponent 324 and a determination component 326. The determination component 326 further includes a summation subcomponent 328 and a threshold subcomponent 330.

The potential initial frequency offset estimation is used by the frequency correction subcomponent 320 to process samples $r_{P-SSIG}$ and $r_{S-SSIG}$ of the received signal flow. The output of the frequency correction subcomponent 320 includes the synchronization signals $X_{P-SSIG}$ and $X_{S-SSIG}$. The frequency corrected signals 332 are buffered for at least 5 ms to allow for channel estimation based on the $X_{P-SSIG}$ 334 with channel estimate coefficients H 336 computed by the channel estimation subcomponent 322. For Fourier transformation and Fourier window positioning, the channel estimation subcomponent 322 uses timing signals and frequency signals provided by the timing component 316 and the coarse frequency estimation component 314, respectively. The physical-layer cell-identity $N_{ID}^{(2)}$ is provided to the channel estimation subcomponent 322 and the cell-identity group correlation subcomponent 324.

The cell-identity group correlation subcomponent 324 adds-up coherently the contributions from the two antennas 302 and 304 and calculates the partial correlation for even-numbered and odd-numbered receive signal elements according to:

$$c_{even}(m_x, cp_{type}) = \sum_{n=0}^{30} X_{S-SSIG}^{cp_{type}}(2n) \cdot s_{m_x}(n) \cdot c_0(n), \text{ and} \quad \text{(Eq. 2)}$$

$$c_{odd}(m_x \bmod 8, m_y, cp_{type}) = \quad \text{(Eq. 3)}$$
$$\sum_{n=0}^{30} X_{S-SSIG}^{cp_{type}}(2n+1) \cdot s_{m_y}(n) \cdot c_1(n) \cdot z_{m_x \bmod 8}(n).$$

The cell-identity group correlation subcomponent 324 is run twice, once for normal and once for extended cyclic prefix data $X_{S-SSIG}^{cp_{type}}(cp_{type}=0, 1)$.

For each cyclic prefix type, the cell-identity group correlation subcomponent 324 investigates the first (partial) correlation $c_{even}$ (according to Eq. 2) to determine one or more first parameters $m_x$, each of which is indicative of mutually disjoint groups of physical-layer parameter pairs ($N_{ID}^{(1)}$, $s_{pos}$). A first parameter $m_x^{max}$ corresponding to the maximum of the first (partial) correlations $c_{even}(m_x, cp_{type})$ for the given cyclic prefix type $cp_{type}$ is determined and applied to the computation of the second (partial) correlations (according to Eq. 3). Alternatively, a list of N first parameters yielding N highest first (partial) correlations are determined as the most probable candidates. Thereby, the number of second (partial) correlations to be computed is reduced, which implies a significant reduction in the number of addition steps required to determine the maximum of the (complete) correlation $c = c_{even} + c_{odd}$.

$$\max(c(N_{ID}^{(1)}, s_{pos}, cp_{type})) = \max\left(\sum_{n=0}^{30} X_{S-SSIG}^{cp_{type}}(2n) \cdot s_{m_x}(n) \cdot c_0(n)\right) +$$
$$\max_{m_x = m_x^{max}}\left(\sum_{n=0}^{30} X_{S-SSIG}^{cp_{type}}(2n+1) \cdot s_{m_y}(n) \cdot c_1(n) \cdot z_{m_x \bmod 8}(n)\right).$$

In a first embodiment, the maxima of odd and even partial correlation results (represented as correlation vectors with indices $m_x$ and $m_y$) are selected before adding the partial correlation results to obtain the (complete) correlation. By this, 335 out of 168×2=336 additions can be saved (regarding the complexity of adding up the first and second partial correlations).

In a second embodiment that is combinable with the first embodiment, not all eight groups of parameters indicated by an index $m'_x = m_x \bmod 8$ are investigated. Rather, the number of calculation steps is further decreased by selecting the N' most probable (odd-numbered) second reference signals (as indicated by the index $m'_x$), wherein the probability is related to a sum of the first (partial) correlation result corresponding the first parameter $m_x$, such that $m'_x = m_x \bmod 8$ for the (given) index $m'_x$. This reduces the number of additions required for creating the (partial) correlation results to 31 additions (corresponding to the sequence length l/2) for each of the M=31 possible reference sequences ($m_{x/y}=0, \ldots, 30$), while there is one group of M reference sequences on the even-numbered $N_{ID}^{(1)}$ and N groups of reference sequences on the odd numbered $N_{ID}^{(2)}$. Eventually, the creation of the partial correlation results has to be repeated for each of the two possible cyclic prefix types, such that the number of addition steps equals 2×(1+N)×31×31. In adding-up the two maxima of the odd and even partial correlation results there is one more addition for each cyclic prefix type, such that the total number of additions is reduced to 2×(1+N)×31×31+2×1=3 846 for N=1 and using the maxima of the partial correlation results only.

In a third embodiment, the advantages of the pre-selection according to any of above embodiments are combined with an efficient computation of the cross-correlations using a Modified Hadamard Transformation (MHT). By virtue of the recursive divide-and-conquer structure of the MHT computation, the complexity of calculating the partial correlations is reduced from $31^2$ to $\log_2(32) \times 32$ according to:

$$c_{even}(m_x, cp_{type}) = \text{MHT}(X_{S-SSIG}^{cp_{type}}(2n) \cdot c_0(n)), \text{ and} \quad \text{(Eq. 2')}$$

$$c_{odd}(m_x \bmod 8, m_y, cp_{type}) = \text{MHT}(X_{S-SSIG}^{cp_{type}}(2n+1) \cdot c_1 (n) \cdot z_{m_x \bmod 8}(n)). \quad \text{(Eq. 3')}$$

Hence, the total number of additions is 2×(1+N)×$\log_2(32)$×32+2×1=642 for N=1 and using the maxima of the partial correlation results only.

Similarly, the maximum of the first (partial) correlation or the N highest first (partial) correlations pre-determine the first parameter $m_x$, based on which the evaluation of the second (partial) correlations yields the second parameter $m_y$ and the cyclic prefix type $cp_{type}$. The physical-layer communication parameters $(N_{ID}^{(1)}, s_{pos})$ follow from the pair of first and second parameters $(m_x, m_y)$.

The maximum of the (complete) correlation is thus:

$$\max(c(N_{ID}^{(1)}, s_{pos}, cp_{type})) = \max(MHT(X_{S\text{-}SSIG}^{cp_{type}}(2n) \cdot c_0(n))) + \max_{m_x = m_x^{max}} (MHT(X_{S\text{-}SSIG}^{cp_{type}}(2n+1) \cdot c_1(n) \cdot z_{m_x \bmod 8}(n))).$$

In an alternative embodiment, instead of analyzing all of the eight groups of second (partial) correlations indicated by $m'_x = m_x \bmod 8$, a stop criterion is defined to terminate the search for the most probable N' parameter groups out of the eight possible parameter groups. Once one or N'>1 correlation values greater or equal to the stop criterion have been pre-selected, the search is terminated.

In a further alternative embodiment, the stop criterion is based on a code distance measure, or a combination of correlation value and code distance. A preferred code distance measure applies a Hamming metric. A preferred stop criterion or threshold condition based on (partial) correlation values uses a maximum (partial) correlation value from a previous successfully verified cell-identity (for example the currently serving cell) multiplied by a threshold factor α. In this embodiment, α equals 0.75.

The cell-identity group detection component 318 generates as output (to the cell-identity detection component 312) a sorted list of the communication parameter sets. A sorting criterion is the (complete) correlation or a combination of correlation values and code distance measure.

In order to further speed-up the processing, the list furthermore starts with the currently serving cell-identity or the N' highest-ranked parameter sets of a previous cell search.

As has become apparent from the above embodiments, the technique presented herein significantly reduces the calculation complexity involved in cell searches, which reduces an energy consumption of a mobile terminal applying the technique, increases a battery runtime and reduces its processing delay. The technique allows high rates of cell identification (at a given limit of computation resources), which increases the quality of the communication link and increases an effective data throughput rate.

While specific embodiments have been shown and described above, various changes, modifications and substitutions may be made without departing from the scope of the present disclosure.

What is claimed is:

1. A method of determining at least one cell-identity in a cellular telecommunication network, the method comprising:
    receiving a synchronization signal including a first partial signal and a second partial signal;
    calculating first correlations between the first partial signal and first reference signals each of the first reference signals indicating one or more first cell-identities;
    calculating second correlations between the second partial signal and second reference signals each of the second reference signals indicating one or more cell-identities out of the one or more first cell-identities, wherein the second reference signals are selected depending on the first correlations; and
    determining the at least one cell-identity based on the second correlations.

2. The method of claim 1, wherein the selected second reference signals correspond to a maximum of the first correlations or to N>1 highest first correlations.

3. The method of claim 1, wherein the selected second reference signals correspond to first correlations fulfilling a threshold condition.

4. The method of claim 1, wherein the selection of the second reference signals stops after a predefined number of second reference signals has been selected.

5. The method of claim 1, wherein the first reference signals are parameterized by a first parameter and the second reference signals are parameterized by the first parameter and a second parameter a maximum of the first correlations determining the first parameter in the calculation of the second correlations.

6. The method of claim 1, further comprising generating a list of the determined at least one cell-identities that is sorted according to the sum of the first correlation and the second correlation corresponding to each of the listed cell-identities.

7. The method of claim 1, wherein the synchronization signal is comprised of signal samples, the first partial signal comprising even-numbered signal samples and the second partial signal comprising odd-numbered signal samples.

8. The method of claim 1, wherein the selected second reference signals further comprise a signal representative of a previous or current cell-identity.

9. The method of claim 1, wherein the determination of the at least one cell-identity further depends on a code distance between at least one of the first and second reference signal and one of the first partial signal, the second partial signal, and the synchronization signal.

10. The method of claim 1, wherein at least one of the first reference signals and the second reference signals includes a maximum length sequence and the calculation of at least one of the first correlations and the second correlations applies a modified Hadamard transformation (MHT).

11. The method of claim 1, wherein first scrambling sequences, $s_{m_x}, c_0$, generate the first reference signal defined as $d_{m_x}(2n)$ according to $$d_{m_x}(2n) = s_{m_x}(n) \cdot c_0(n)$$

and second scrambling sequences, $s_{m_y}, c_1, z_{m_x}$, generate the second reference signal defined as $d_{m_x, m_y}(2n+1)$ according to $$d_{m_x, m_y}(2n+1) = s_{m_y}(n) \cdot c_1(n) \cdot z_{m_x}(n),$$

a pair of a first parameter, $m_x$, and a second parameter, $m_y$, uniquely indicating one cell-identity.

12. The method of claim 11, wherein at least one of the first reference signals and the second reference signals includes a maximum length sequence and the calculation of at least one of the first correlations and the second correlations applies a modified Hadamard transformation (MHT), and wherein the first correlations equal $$c_{even}(m_x) = MHT(X(2n) \cdot c_0(n))$$

and the second correlations equal $$c_{odd}(m_x, m_y) = MHT(X(2n+1) \cdot c_1(n) \cdot z_{m_x}(n)),$$

wherein $X(2n)$ represents the first partial signal and $X(2n+1)$ represents the second partial signal.

13. The method of claim 1, wherein each of the first reference signals and/or each of the second reference signals further indicates at least one of a timing position and a cyclic prefix type of the received signal.

14. A computer program product stored on a non-transitory, computer-readable recording medium and comprising program code that, when executed on a computer system, cause the computer system to determine at least one cell-identity in a cellular telecommunication network, wherein the computer system is associated with a receiver for receiving a synchronization signal including a first partial signal and a second partial signal and further wherein the program code causes the computer system to:

calculate first correlations between the first partial signal and first reference signals each of the first reference signals indicating one or more first cell-identities;

calculate second correlations between the second partial signal and second reference signals each of the second reference signals indicating one or more cell-identities out of the one or more first cell-identities, wherein the second reference signals are selected depending on the first correlations; and determine the at least one cell-identity based on the second correlations.

15. A device for determining at least one cell-identity in a cellular telecommunication network, the device comprising:

a receiver configured to receive a synchronization signal including a first partial signal and a second partial signal; and a processor configured to:

calculate first correlations between the first partial signal and first reference signals each of the first reference signals indicating one or more first cell-identities;

calculate second correlations between the second partial signal and second reference signals each of the second reference signals indicating one or more cell-identities out of the one or more first cell-identities, wherein the second reference signals are selected depending on the first correlations; and determine the at least one cell-identity based on the second correlations.

16. The device of claim 15, wherein the selected second reference signals correspond to a maximum of the first correlations or to N>1 highest first correlations.

17. The device of claim 15, wherein the first reference signals are parameterized by a first parameter and the second reference signals are parameterized by the first parameter and a second parameter a maximum of the first correlations determining the first parameter in the calculation of the second correlations.

18. The device of claim 15, wherein the selected second reference signals correspond to first correlations fulfilling a threshold condition.

19. The device of claim 15, wherein the selection of the second reference signals stops after a predefined number of second reference signals has been selected.

20. The device of claim 15, wherein the processor is further configured to generate a list of the determined at least one cell-identities that is sorted according to the sum of the first correlation and the second correlation corresponding to each of the listed cell-identities.

\* \* \* \* \*

UNITED STATES PATENT AND TRADEMARK OFFICE
CERTIFICATE OF CORRECTION

PATENT NO. : 8,588,774 B2  
APPLICATION NO. : 12/964398  
DATED : November 19, 2013  
INVENTOR(S) : Klein et al.

Page 1 of 1

It is certified that error appears in the above-identified patent and that said Letters Patent is hereby corrected as shown below:

In the Specification

In Column 3, Line 19, delete "$(N_{1D}^{(1)}, S_{pos})$" and insert -- $(N_{ID}^{(1)}, S_{pos})$ --.

In Column 10, Line 15, delete "$+c_{odd}.$" and insert -- $+c_{odd}:$ --.

In Column 11, Line 31, delete "a" and insert -- $\alpha$ --.

Signed and Sealed this  
Eighth Day of April, 2014

Michelle K. Lee  
*Deputy Director of the United States Patent and Trademark Office*